(12) United States Patent
Delsman et al.

(10) Patent No.: US 8,507,636 B2
(45) Date of Patent: Aug. 13, 2013

(54) HIGH MOLECULAR WEIGHT POLY(2,6-DIMETHYL-1,4-PHENYLENE ETHER) AND PROCESS THEREFOR

(75) Inventors: Erik Rene Delsman, Breda (NL); Gert-Jan Schoenmakers, Prinsenbeek (NL)

(73) Assignee: Sabic Innovative Plastics IP B.V. (NL)

(*) Notice: Subject to any disclaimer, the term of this patent is extended or adjusted under 35 U.S.C. 154(b) by 0 days.

(21) Appl. No.: 13/205,131

(22) Filed: Aug. 8, 2011

(65) Prior Publication Data

US 2011/0293937 A1 Dec. 1, 2011

Related U.S. Application Data

(62) Division of application No. 12/255,694, filed on Oct. 22, 2008, now Pat. No. 8,025,158.

(60) Provisional application No. 61/030,336, filed on Feb. 21, 2008.

(51) Int. Cl.
*C08G 65/38* (2006.01)
*C08G 65/44* (2006.01)
*C08G 65/00* (2006.01)

(52) U.S. Cl.
USPC .............................. 528/212; 528/86; 528/396

(58) Field of Classification Search
USPC ........................................ 528/86, 396, 212
See application file for complete search history.

(56) References Cited

U.S. PATENT DOCUMENTS

| | | | |
|---|---|---|---|
| 3,306,874 A | 2/1967 | Hay | |
| 3,838,102 A | 9/1974 | Bennett et al. | |
| 3,852,388 A | 12/1974 | Kimura | |
| 3,951,917 A | 4/1976 | Floryan et al. | |
| 4,039,510 A | 8/1977 | Cooper et al. | |
| 4,110,311 A | 8/1978 | Cooper et al. | |
| 4,116,939 A | 9/1978 | Cooper et al. | |
| 4,486,202 A | 12/1984 | Malon et al. | |
| 4,944,775 A | 7/1990 | Hayes | |
| 5,069,818 A | 12/1991 | Aycock et al. | |
| 5,181,940 A | 1/1993 | Bikson et al. | |
| 5,215,554 A | 6/1993 | Kramer et al. | |
| 5,679,133 A | 10/1997 | Moll et al. | |
| 5,779,897 A | 7/1998 | Kalthod et al. | |
| 6,407,202 B1 | 6/2002 | Braat et al. | |
| 6,472,499 B1 | 10/2002 | Braat et al. | |
| 6,897,282 B2 | 5/2005 | Freshour et al. | |
| 7,205,377 B2 | 4/2007 | Ingelbrecht et al. | |
| 7,229,580 B2 | 6/2007 | Yuan | |
| 2007/0106051 A1 | 5/2007 | Carrillo et al. | |
| 2008/0071059 A1 | 3/2008 | Nishide et al. | |

OTHER PUBLICATIONS

Smid et al., The formation of asymmetric hollow fibre membranes for gas separation, using PPE of different intrinsic viscosities, Journal of Membrane Science, 64 (1991), 121-128.
International Search Report; International Application No. PCT/IB2009/050454; International Filing Date Apr. 2, 2009; 4 pages.
Written Opinion of the International Search Authority; International Application No. PCT/IB2009/050454; International Filing Date Apr. 2, 2009; 9 pages.
WO2004096888A1; Nov. 11, 2004; Abstract Only (1 page).
JP2007039668A; Feb. 15, 2007; Abstract Only (1 page).
JP11060700A; Mar. 2, 1999; Abstract Only (1 page).
WO2006065519 (A1), Abstract, Jun. 22, 2006, 1 page.
European Search Report for EP11152221, Mar. 2, 2011, 5 pages.
JP2004352988, Abstract, Dec. 15, 2004, 1 page.
JP2004352988A; Dec. 16, 2004; Machine Translation; 37 pages.

*Primary Examiner* — Duc Truong
(74) *Attorney, Agent, or Firm* — Cantor Colburn LLP

(57) ABSTRACT

A poly(2,6-dimethyl-1,4-phenylene ether) having a high molecular weight and a reduced content of low molecular weight species can be prepared by a method that includes specific conditions for the oxidative polymerization, chelation, and isolation steps. The poly(2,6-dimethyl-1,4-phenylene ether) is particularly useful for the fabrication of fluid separation membranes.

6 Claims, No Drawings

HIGH MOLECULAR WEIGHT POLY(2,6-DIMETHYL-1,4-PHENYLENE ETHER) AND PROCESS THEREFOR

CROSS REFERENCE TO RELATED APPLICATIONS

This application is a division of U.S. patent application Ser. No. 12/255,694, filed Oct. 22, 2008 now U.S. Pat. No. 8,025,158, which claims the benefit of U.S. Provisional Patent Application Ser. No. 61/030,336, filed Feb. 21, 2008. The related applications are fully incorporated herein by reference.

BACKGROUND OF THE INVENTION

Polyphenylene ether) resin is a type of plastic known for its excellent water resistance, dimensional stability, and inherent flame retardancy, as well as high oxygen permeability and oxygen/nitrogen selectivity. Properties such as strength, stiffness, chemical resistance, and heat resistance can be tailored by blending it with various other plastics in order to meet the requirements of a wide variety of consumer products, for example, plumbing fixtures, electrical boxes, automotive parts, and insulation for wire and cable.

The most commercially important polyphenylene ether is currently poly(2,6-dimethyl-1,4-phenylene ether), which is prepared on a large scale by the oxidative polymerization of 2,6-dimethylphenol (also known as 2,6-xylenol). For certain product applications, notably use in hollow fiber membranes, very high molecular weight poly(2,6-dimethyl-1,4-phenylene ether)s are needed. Not only must the average molecular weight be very high, but the sample must have a small weight percent of low molecular weight polymer chains. There is therefore a need for poly(2,6-dimethyl-1,4-phenylene ether)s that have but a high number average molecular weight and a reduced fraction of low molecular weight molecules.

The literature includes various procedures for the preparation of high molecular weight poly(2,6-dimethyl-1,4-phenylene ether)s, but these procedures are deficient for one reason or another. For example, U.S. Pat. Nos. 4,110,311 and 4,116,939 to Cooper et al. require the addition of chemical compounds that interfere with the solvent recycling that is required to make commercial process environmentally acceptable. Specifically, U.S. Pat. No. 4,110,311 requires the addition of a dihydric phenol and a mild reducing during the copper removal step, and U.S. Pat. No. 4,116,939 requires the addition of an aromatic amine. As another example, U.S. Pat. No. 6,472,499 B1 to Braat et al. provides a commercially viable process for producing high molecular weight poly(2,6-dimethyl-1,4-phenylene ether)s, but the present inventors have observed that the products of the Braat et al. process, once isolated, have a relatively large fraction of lower molecular weight molecules. Other references provide procedures that are suitable for use on a laboratory scale, but for reasons that are not always well understood it is difficult or impossible to successfully translate the procedures to a commercial scale. It should also be noted that many references characterize product poly(2,6-dimethyl-1,4-phenylene ether)s in terms of intrinsic viscosity, rather than molecular weight, and there is no way to deduce a specific molecular weight distribution from an intrinsic viscosity value.

There therefore remains a need for poly(2,6-dimethyl-1,4-phenylene ether)s having high number average molecular weight and reduced content of molecules with low molecular weight (e.g., polymer chains with a molecular weight less than 30,000 atomic mass units). There is also a need for improved, commercially scalable, and environmentally acceptable processes for producing such poly(2,6-dimethyl-1,4-phenylene ether)s.

BRIEF DESCRIPTION OF THE INVENTION

The above-described and other drawbacks are alleviated by a method of preparing a high molecular weight poly(2,6-dimethyl-1,4-phenylene ether), comprising: oxidatively polymerizing 2,6-dimethylphenol in toluene solvent in the presence of a catalyst comprising copper ion and N,N'-di-tert-butylethylenediamine to form a reaction mixture comprising a dissolved poly(2,6-dimethyl-1,4-phenylene ether), water, and the catalyst; wherein the oxidative polymerizing comprises initiating oxidative polymerization in the presence of no more than 10 weight percent of the 2,6-dimethylphenol; wherein at least 95 weight percent of the 2,6-dimethylphenol is added to the reaction mixture after the initiation of oxidative polymerization and over the course of at least 50 minutes; wherein the oxidatively polymerizing comprises adding molecular oxygen and 2,6-dimethylphenol to the reaction mixture in a mole ratio of 0.3:1 to 0.65:1; terminating the oxidative polymerization to form a post-termination reaction mixture; combining a chelant comprising an alkali metal salt of nitrilotriacetic acid with the post-termination reaction mixture to form a chelation mixture comprising an aqueous phase comprising chelated copper ion and an organic phase comprising the dissolved poly(2,6-dimethyl-1,4-phenylene ether); wherein the chelation mixture excludes dihydric phenols and aromatic amines; maintaining the chelation mixture at a temperature of 40 to 55° C. for 5 to 100 minutes; separating the aqueous phase and the organic phase; wherein the separation is conducted at a temperature of 40 to 55° C.; and isolating the poly(2,6-dimethyl-1,4-phenylene ether) from the separated organic phase; wherein time elapsed between termination of the oxidative polymerization and isolating the poly(2,6-dimethyl-1,4-phenylene ether) is no more than 200 minutes; and wherein the isolated poly(2,6-dimethyl-1,4-phenylene ether) has a number average molecular weight of at least 18,000 atomic mass units and less than 30 weight percent of molecules having a molecular weight less than 30,000 atomic mass units.

Another embodiment is a poly(2,6-dimethyl-1,4-phenylene ether) solid having a number average molecular weight of at least 18,000 atomic mass units, and less than 30 weight percent of molecules having a molecular weight less than 30,000 atomic mass units.

Another embodiment is a fiber comprising the poly(2,6-dimethyl-1,4-phenylene ether) solid.

Another embodiment is an article comprising the poly(2,6-dimethyl-1,4-phenylene ether) solid.

Another embodiment is an asymmetric hollow fiber membrane comprising the poly(2,6-dimethyl-1,4-phenylene ether) solid.

Another embodiment is a fluid separation apparatus comprising the asymmetric hollow fiber membrane.

These and other embodiments are described in detail below.

DETAILED DESCRIPTION OF THE INVENTION

As noted above, when practicing the poly(2,6-dimethyl-1,4-phenylene ether) synthesis method of U.S. Pat. No. 6,472,499 B1 to Braat et al. on a commercial scale, the present inventors observed that the finally isolated poly(2,6-dimethyl-1,4-phenylene ether) had a relatively large fraction of lower molecular weight molecules, despite its high weight average molecular weight. Through extensive research on the process, the inventors arrived at a very specific combination of process conditions that is effective to produce a poly(2,6-dimethyl-1,4-phenylene ether) having both a high number average molecular weight and a low fraction of low molecular weight molecules. Thus, one embodiment is a method of preparing a high molecular weight poly(2,6-dimethyl-1,4-phenylene ether), comprising: oxidatively polymerizing 2,6-dimethylphenol in toluene solvent in the presence of a catalyst comprising copper ion and N,N'-di-tert-butylethylenediamine to form a reaction mixture comprising a dissolved poly(2,6-dimethyl-1,4-phenylene ether), water, and the catalyst; wherein the oxidative polymerizing comprises initiating oxidative polymerization in the presence of no more than 10 weight percent of the 2,6-dimethylphenol (wherein at least 95 weight percent of the 2,6-dimethylphenol is added to the reaction mixture after the initiation of oxidative polymerization and over the course of at least 50 minutes, and wherein the oxidatively polymerizing comprises adding molecular oxygen and 2,6-dimethylphenol to the reaction mixture in a mole ratio of 0.3:1 to 0.65:1); terminating the oxidative polymerization to form a post-termination reaction mixture; combining a chelant comprising an alkali metal salt of nitrilotriacetic acid with the post-termination reaction mixture to form a chelation mixture comprising an aqueous phase comprising chelated copper ion and an organic phase comprising the dissolved poly(2,6-dimethyl-1,4-phenylene ether) (wherein the chelation mixture excludes dihydric phenols and aromatic amines); maintaining the chelation mixture at a temperature of 40 to 55° C. for 5 to 100 minutes; separating the aqueous phase and the organic phase; wherein the separation is conducted at a temperature of 40 to 55° C.; and isolating the poly(2,6-dimethyl-1,4-phenylene ether) from the separated organic phase; wherein time elapsed between termination of the oxidative polymerization and isolating the poly(2,6-dimethyl-1,4-phenylene ether) is no more than 200 minutes; and wherein the isolated poly(2,6-dimethyl-1,4-phenylene ether) has a number average molecular weight of at least 18,000 atomic mass units and less than 30 weight percent of molecules having a molecular weight less than 30,000 atomic mass units. Several aspects of this process are surprising. First, it was unexpected that the intrinsic viscosity drop observed between termination of the polymerization reaction and isolation of the final product could be substantially reduced without adding to the chelation mixture the dihydric phenol and mild reducing required by U.S. Pat. No. 4,110,311, or the aromatic amine required by U.S. Pat. No. 4,116,939. Second, it was unexpected that the time and temperature of the chelation step could be substantially reduced without interfering with the copper recovery that is the primary purpose of that step. Third, it was unexpected that the intrinsic viscosity drop could be reduced by maintaining a particular fixed addition ratio of molecular oxygen to 2,6-dimethylphenol (rather than using the conventional technique of regulating oxygen addition to maintain a constant concentration of oxygen in the reactor headspace). Fourth, it was unexpected that the process could produce an isolated poly(2,6-dimethyl-1,4-phenylene ether) having a number average molecular weight of at least 18,000 atomic mass units and less than 30 weight percent of molecules having a molecular weight less than 30,000 atomic mass units. Fifth, it was unexpected that a pre-concentration (solvent removal) step could be excluded from the process without adversely affecting isolation of the poly(2,6-dimethyl-1,4-phenylene ether).

The process includes the step of oxidatively polymerizing 2,6-dimethylphenol. The oxidative polymerization is conducted in toluene solvent in the presence of a catalyst comprising copper ion and N,N'-di-tert-butylethylenediamine to form a reaction mixture comprising a dissolved poly(2,6-dimethyl-1,4-phenylene ether), water, and the catalyst. In some embodiments, the catalyst further comprises dimethyl-n-butylamine, di-n-butylamine, or a mixture thereof. The oxidative polymerization is initiated by the introduction of oxygen to the reaction vessel. At the time of initiating polymerization, no more than 10 weight percent of the total 2,6-dimethylphenol is present in the reaction mixture. Specifically, the amount of 2,6-dimethylphenol initially present in the reaction vessel can be 1 to 10 weight percent, more specifically 1 to 5 weight percent, even more specifically 1 to 3 weight percent, based on the total weight of 2,6-dimethylphenol. The remaining 2,6-dimethylphenol, corresponding to at least 95 weight percent of the 2,6-dimethylphenol, is added to the reaction mixture after the initiation of oxidative polymerization and over the course of at least 50 minutes, specifically 50 to 80 minutes, more specifically 55 to 65 minutes. During oxidative polymerization, molecular oxygen and 2,6-dimethylphenol are added to the reaction mixture in a mole ratio of 0.3:1 to 0.65:1, specifically 0.3:1 to 0.6:1, more specifically 0.3:1 to 0.5:1. The use of the fixed ratio and the value of the ratio are believed to contribute significantly to the desired molecular weight properties of final polymer product.

In some embodiments, the total weight of 2,6-dimethylphenol is 5 to 10 weight percent, specifically 6 to 9 weight percent, more specifically 6 to 8 weight percent, based on the total weight of 2,6-dimethylphenol and toluene solvent.

In some embodiments, the oxidative polymerization reaction can be characterized as comprising two stages: a first (exothermic) stage during which the reaction vessel is cooled to maintain a desired temperature, and a second ("build") phase during which the reaction vessel is heated to maintain a desired temperature. During the first (exothermic) stage, the reaction mixture can be cooled to maintain a temperature of 10 to 35° C., specifically 20 to 30° C. During the second ("build") stage, the reaction mixture can be heated to maintain a temperature of 20 to 50° C., specifically 25 to 46° C., more specifically 30 to 40° C.

Depending on the precise reaction conditions chosen, the total polymerization reaction time—that is, the time elapsed between initiating oxidative polymerization and terminating oxidative polymerization—can vary, but it is typically 120 to 250 minutes, specifically 145 to 210 minutes.

The method further comprises the step of terminating the oxidative polymerization to form a post-termination reaction mixture. The reaction is terminated when the flow of oxygen to the reaction vessel is stopped. Residual oxygen in the reaction vessel headspace is removed by flushing with an oxygen-free gas, such as nitrogen.

After the polymerization reaction is terminated, the copper ion of the polymerization catalyst is separated from the reaction mixture. This is accomplished by combining a chelant with the post-termination reaction mixture to form a chelation mixture. The chelant comprises an alkali metal salt of nitrilotriacetic acid. In some embodiments, the chelant is a sodium or potassium salt of nitrilotriacetic acid, specifically trisodium nitrilotriacetate. After agitation of the chelation mixture, that mixture comprises an aqueous phase comprising chelated copper ion and an organic phase comprising the dissolved poly(2,6-dimethyl-1,4-phenylene ether). The chelation mixture excludes the dihydric phenol required by U.S. Pat. No. 4,110,311 to Cooper et al. The chelation mixture also excludes the aromatic amine required by U.S. Pat. No. 4,116,939 to Cooper et al. In some embodiments, the chelation mixture further excludes the mild reducing agents of U.S. Pat. No. 4,110,311 to Cooper et al., which include sulfur dioxide, sulfurous acid, sodium bisulfite, sodium thionite, tin (II) chloride, iron (II) sulfate, chromium (II) sulfate, titanium (III) chloride, hydroxylamines and salts thereof, phosphates, glucose, and mixtures thereof. The chelation mixture is maintained at a temperature of 40 to 55° C., specifically 45 to 50° C., for 5 to 100 minutes, specifically 10 to 60 minutes, more specifically 15 to 30 minutes. The present inventors have observed that this combination of temperature and time is effective for copper sequestration while also minimizing molecular weight degradation of the poly(2,6-dimethyl-1,4-phenylene ether). The chelation step includes (and concludes with) separating the aqueous phase and the organic phase of the chelation mixture. This separation step is conducted at a temperature of 40 to 55° C., specifically 45 to 50° C. The time interval of 5 to 100 minutes for maintaining the chelation mixture at 40-55° C. is measured from the time at which the post-termination reaction mixture is first combined with chelant to the time at which separation of the aqueous and organic phases is complete.

In some embodiments, the combining a chelant with the post-termination reaction mixture to form a chelation mixture comprises combining the post-termination reaction mixture with an aqueous solution of the chelant, adjusting the temperature of the resulting mixture to 40 to 55° C., specifically 40 to 50° C., more specifically 45 to 50° C., and combining the resulting temperature-adjusted mixture with water to form the chelation mixture.

In order to reduce the elapsed time between terminating the oxidative polymerization reaction and isolating the poly(2,6-dimethyl-1,4-phenylene ether), it may be desirable to exclude a solvent removal step (sometimes called a "pre-concentration" step) between the terminating the oxidative polymerization and the isolating the poly(2,6-dimethyl-1,4-phenylene ether). As a result of such exclusion, the separated organic phase resulting from the chelation step can be used directly in the isolation step. Thus, in some embodiments, isolation is conducted on a poly(2,6-dimethyl-1,4-phenylene ether) solution in which the poly(2,6-dimethyl-1,4-phenylene ether) is present at a concentration of 5 to 10 weight percent, specifically 6 to 9 weight percent, more specifically 6 to 8 weight percent, based on the total weight of the poly(2,6-dimethyl-1,4-phenylene ether) solution.

In addition to polymerization and chelation steps, the method includes isolating the poly(2,6-dimethyl-1,4-phenylene ether) from the separated organic phase. Isolation methods that avoid exposing the separated organic phase to elevated temperatures—such as precipitation—are preferred. In some embodiments, the method excludes any step, such as devolatilizing extrusion, that exposes the poly(2,6-dimethyl-1,4-phenylene ether) to a temperature above its glass transition temperature. When the isolation method comprises precipitation, the separated organic phase is combined with an antisolvent. Suitable antisolvents include $C_1$-$C_{10}$ alkanols, $C_3$-$C_{10}$ ketones, $C_5$-$C_{12}$ alkanes, and mixtures thereof. The antisolvent may, optionally, further comprise water, a $C_6$-$C_{12}$ aromatic hydrocarbon (such as benzene, toluene, or xylene), or both.

In some embodiments, isolating the poly(2,6-dimethyl-1,4-phenylene ether) from the separated organic phase comprises mixing in a first stirred tank the separated organic phase and a first portion of antisolvent to produce a first poly(2,6-dimethyl-1,4-phenylene ether) slurry; and mixing in a second stirred tank the first poly(2,6-dimethyl-1,4-phenylene ether) slurry and a second portion of antisolvent to produce a second poly(2,6-dimethyl-1,4-phenylene ether) slurry. The separated organic phase can, optionally, comprise 6 to 10 weight percent poly(2,6-dimethyl-1,4-phenylene ether). In some embodiments, the first portion of antisolvent and the second portion of antisolvent each independently comprise 75 to 85 weight percent methanol and 15 to 25 weight percent toluene. In some embodiments, the weight ratio of the separated organic phase to the first portion of antisolvent is 1.5:1 to 2:1; and wherein the weight ratio of the first poly(2,6-dimethyl-1,4-phenylene ether) slurry to the second portion of antisolvent is 0.9:1 to 1.2:1. In some embodiments, the mixing in a first stirred tank and the mixing in a second stirred tank are each independently conducted at a temperature of 45 to 55° C. In some embodiments, the mixing in a first stirred tank and the mixing in a second stirred tank are characterized by a total mixing energy of less than or equal to 4 kilojoules per kilogram, specifically 0.1 to 4 kilojoules per kilogram, more specifically 0.2 to 3 kilojoules per kilogram, still more specifically 0.2 to 2 kilojoules per kilogram, even more specifically 0.2 to 1 kilojoule per kilogram, yet more specifically 0.3 to 0.5 kilojoule per kilogram. The total mixing energy can be determined by measuring the energy consumption of the stirring device and dividing the energy consumption by the corresponding material throughput.

In a very specific embodiment, precipitation is performed in two stirred tanks in series. In the first stirred tank the separated organic phase (6-10 weight percent poly(2,6-dimethyl-1,4-phenylene ether)) is mixed with a first portion of antisolvent (75-85 weight percent methanol and 15-25 weight percent toluene) to produce a first slurry. In the second tank the first slurry is mixed with an additional portion of antisolvent (75-85 weight percent methanol and 15-25 weight percent toluene). The first stirred tank can have an agitator with three sets of 4-blade turbines, 3.7 kilowatts stirring power, a residence time of about 30 minutes (thus a stirring energy input of 6.7 megajoules), and a methanol concentration of about 30%. The second stirred tank can have an agitator with one 4-blade turbine, 2.2 kilowatts stirring power, a residence time of about 15 minutes (thus a stirring energy input of 2.0 megajoules), and a methanol concentration of about 55 weight percent. The first and second stirred tank can each be maintained at a temperature of about 50° C.

The method requires that the time elapsed between termination of the oxidative polymerization and isolating the poly (2,6-dimethyl-1,4-phenylene ether) is no more than 200 minutes. In some embodiments, that time is 30 to 200 minutes, specifically 30 to 100 minutes, more specifically 30 to 60 minutes.

An important advantage of the method is that it produces an isolated poly(2,6-dimethyl-1,4-phenylene ether) solid having a number average molecular weight of at least 18,000 atomic mass units. In some embodiments, the number average molecular weight is 18,000 to 100,000 atomic mass units, specifically 19,000 to 70,000 atomic mass units, more specifically 20,000 to 40,000 atomic mass units, even more specifically 20,000 to 35,000 atomic mass units.

In some embodiments, the isolated poly(2,6-dimethyl-1,4-phenylene ether) has a weight average molecular weight of at least 150,000 atomic mass units, specifically 150,000 to 400,000 atomic mass units, more specifically 170,000 to 300,000 atomic mass units, still more specifically 200,000 to 250,000 atomic mass units, yet more specifically 200,000 to 230,000 atomic mass units.

Another important advantage of the method is that it produces an isolated poly(2,6-dimethyl-1,4-phenylene ether) having less than 30 weight percent of molecules having a molecular weight less than 30,000 atomic mass units. In some embodiments, the weight percent of molecules having a molecular weight less than 30,000 atomic mass units is 10 to 30 weight percent, specifically 15 to 27 weight percent, more specifically 16 to 20 weight percent.

The desirable molecular weight distribution of the isolated poly(2,6-dimethyl-1,4-phenylene ether) is, in part, a consequence of reducing the change in molecular weight distribution that would occur in the chelation and pre-concentration steps of conventional processes. Thus, in some embodiments, a difference (reduction) in intrinsic viscosity less than or equal to 25 percent is observed between the dissolved poly (2,6-dimethyl-1,4-phenylene ether) and the isolated poly(2,6-dimethyl-1,4-phenylene ether). Specifically, the difference in intrinsic viscosity can be 10 to 25 percent, more specifically 10 to 20 percent, still more specifically 11 to 15 percent. In absolute terms, the difference in intrinsic viscosity can be less than or equal to 0.30 deciliters per gram between the dissolved poly(2,6-dimethyl-1,4-phenylene ether) and the isolated poly(2,6-dimethyl-1,4-phenylene ether). Values of the difference in intrinsic viscosity are presented in Table 1 in the row labeled "IV drop (%)". For instance, Example 2 exhibits a difference in intrinsic viscosity of 100×(1.84−1.64)/1.84=11%.

Similarly, in some embodiments, a difference in weight percent of molecules having a molecular weight less than 30,000 atomic mass units less than or equal to 25 weight percent is observed between the dissolved poly(2,6-dimethyl-1,4-phenylene ether) and the isolated poly(2,6-dimethyl-1,4-phenylene ether). Specifically, the difference in weight percent of molecules can be 5 to 25 weight percent, more specifically 8 to 20 weight percent, even more specifically 9 to 15 weigh percent. As an illustration of this metric, consider the data for Example 2 in Table 1, below. For the dissolved ("end of reaction") poly(2,6-dimethyl-1,4-phenylene ether), the weight percent of molecules having a molecular weight less than 30,000 atomic mass units is 5.9%, and for the isolated poly(2,6-dimethyl-1,4-phenylene ether), the weight percent of molecules having a molecular weight less than 30,000 atomic mass units is 16.2%, so the difference is 16.2%−5.9%=10.3%.

An unexpected advantage of the method is that the isolated poly(2,6-dimethyl-1,4-phenylene ether) has a low residual copper concentration, even though the time and temperature of the chelation step are reduced substantially compared to conventional commercial methods. Thus, in some embodiments, the isolated poly(2,6-dimethyl-1,4-phenylene ether) has a copper concentration less than or equal to 5 parts per million by weight, specifically 0.1 to 5 parts per million by weight, more specifically 0.5 to 5 parts per million by weight, even more specifically 0.5 to 3 parts per million by weight, yet more specifically 1 to 3 parts per million by weight.

In some embodiments, the oxidative polymerizing comprises initiating oxidative polymerization in the presence of 1 to 3 weight percent of the 2,6-dimethylphenol; at least 97 weight percent of the 2,6-dimethylphenol is added to the reaction mixture after the initiation of oxidative polymerization and over the course of 55 to 65 minutes; the oxidatively polymerizing comprises adding molecular oxygen and 2,6-dimethylphenol to the reaction mixture in a mole ratio of 0.3:1 to 0.5:1; the oxidatively polymerizing 2,6-dimethylphenol comprises a first stage in which the reaction mixture is cooled to maintain a temperature of 20 to 30° C., and a second stage in which the reaction mixture is heated to maintain a temperature of 30 to 40° C.; the method further comprises maintaining the reaction mixture at a temperature of 45 to 50° C. after terminating the oxidative polymerization and before combining the chelant with the post-termination reaction mixture; the method excludes a solvent removal step between the terminating the oxidative polymerization and the isolating the poly(2,6-dimethyl-1,4-phenylene ether); the chelation mixture is maintained at a temperature of 45 to 55° C. for 40 to 70 minutes; the separating the aqueous phase and the organic phase is conducted at a temperature of 45 to 55° C.; the time elapsed between termination of the oxidative polymerization and isolating the poly(2,6-dimethyl-1,4-phenylene ether) is 30 to 60 minutes; the isolated poly(2,6-dimethyl-1,4-phenylene ether) has a number average molecular weight of 20,000 to 35,000 atomic mass units and 16 to 20 weight percent of molecules having a molecular weight less than 30,000 atomic mass units; and the isolated poly(2,6-dimethyl-1,4-phenylene ether) has a copper concentration of 0.5 to 5 parts per million by weight.

One embodiment is a poly(2,6-dimethyl-1,4-phenylene ether) solid having a number average molecular weight of at least 18,000 atomic mass units, and less than 30 weight percent of molecules having a molecular weight less than 30,000 atomic mass units. Specifically the number average molecular weight can be 18,000 to 100,000 atomic mass units, more specifically 19,000 to 70,000 atomic mass units, still more specifically 20,000 to 40,000 atomic mass units, yet more specifically 20,000 to 35,000 atomic mass units. And the weight percent of molecules having a molecular weight less than 30,000 atomic mass units can be, specifically, 10 to 30 weight percent, more specifically 15 to 27 weight percent, still more specifically 16 to 20 weight percent. In some embodiments, the poly(2,6-dimethyl-1,4-phenylene ether) solid has a copper concentration less than or equal to 5 parts per million by weight, specifically 0.1 to 5 parts per million by weight, more specifically 0.5 to 5 parts per million by weight, even more specifically 0.5 to 3 parts per million by weight, yet more specifically 1 to 3 parts per million by weight.

One embodiment is a poly(2,6-dimethyl-1,4-phenylene ether) solid having a number average molecular weight of 20,000 to 35,000 atomic mass units, 16 to 20 weight percent of molecules having a molecular weight less than 30,000 atomic mass units, and a copper concentration of 0.5 to 5 parts per million by weight.

The poly(2,6-dimethyl-1,4-phenylene ether) solid is particularly useful for forming fibers, especially hollow fibers for use in asymmetric hollow fiber membranes. Techniques for preparing asymmetric hollow fiber membranes comprising polyphenylene ethers are known in the art and described in, for example, J. Smid, J. H. M. Albers, and A. P. M. Kusters, Journal of Membrane Science, volume 64, pages 121-128 (1991), and U.S. Pat. Nos. 3,852,388 to Kimura, 4,486,202 to Malon et al., 4,944,775 to Hayes, 5,181,940 to Bikson, 5,215,554 to Kramer et al., and 7,229,580 to Yuan. Another embodiment is a fluid separation apparatus comprising an asymmetric hollow fiber membrane comprising the poly(2,6-dimethyl-1,4-phenylene ether) solid. For example, the fluid separation apparatus can be used to separate oxygen from air. Techniques for constructing fluid separation apparatuses comprising asymmetric hollow fiber membranes are known in the art and described in, for example, U.S. Pat. Nos. 5,679,133 to Moll et al., and 5,779,897 to Kalthod et al.

The poly(2,6-dimethyl-1,4-phenylene ether) is also useful for forming other articles, such as pipes, conduits, and other extruded profiles for use in construction of building interiors. The compositions used to form such article may comprise, in addition to the poly(2,6-dimethyl-1,4-phenylene ether), a poly(alkenyl aromatic), a polyolefin, a polyamide, a polyester, or a combination thereof, as well as various additives known in the thermoplastic arts. Articles can be prepared using fabrication methods known in the art, including, for example, single layer and multilayer foam extrusion, single layer and multilayer sheet extrusion, injection molding, blow molding, extrusion, film extrusion, profile extrusion, pultrusion, compression molding, thermoforming, pressure forming, hydroforming, vacuum forming, foam molding, and the like. Combinations of the foregoing article fabrication methods can be used.

The invention includes at least the following embodiments.

Embodiment 1

A method of preparing a poly(2,6-dimethyl-1,4-phenylene ether), comprising: oxidatively polymerizing 2,6-dimethylphenol in toluene solvent in the presence of a catalyst comprising copper ion and N,N'-di-tert-butylethylenediamine to form a reaction mixture comprising a dissolved poly(2,6-dimethyl-1,4-phenylene ether), water, and the catalyst; wherein the oxidative polymerizing comprises initiating oxidative polymerization in the presence of no more than 10 weight percent of the 2,6-dimethylphenol; wherein at least 95 weight percent of the 2,6-dimethylphenol is added to the reaction mixture after the initiation of oxidative polymerization and over the course of at least 50 minutes; wherein the oxidatively polymerizing comprises adding molecular oxygen and 2,6-dimethylphenol to the reaction mixture in a mole ratio of 0.3:1 to 0.65:1; terminating the oxidative polymerization to form a post-termination reaction mixture; combining a chelant comprising an alkali metal salt of nitrilotriacetic acid with the post-termination reaction mixture to form a chelation mixture comprising an aqueous phase comprising chelated copper ion, and an organic phase comprising the dissolved poly(2,6-dimethyl-1,4-phenylene ether); wherein the chelation mixture excludes dihydric phenols and aromatic amines; maintaining the chelation mixture at a temperature of 40 to 55° C. for 5 to 100 minutes; separating the aqueous phase and the organic phase; wherein the separation is conducted at a temperature of 40 to 55° C.; and isolating the poly(2,6-dimethyl-1,4-phenylene ether) from the separated organic phase; wherein time elapsed between termination of the oxidative polymerization and isolating the poly(2,6-dimethyl-1,4-phenylene ether) is no more than 200 minutes; and wherein the isolated poly(2,6-dimethyl-1,4-phenylene ether) has a number average molecular weight of at least 18,000 atomic mass units and less than 30 weight percent of molecules having a molecular weight less than 30,000 atomic mass units.

Embodiment 2

The method of embodiment 1, wherein the chelation mixture further excludes mild reducing agents selected from the group consisting of sulfur dioxide, sulfurous acid, sodium bisulfite, sodium thionite, tin (II) chloride, iron (II) sulfate, chromium (II) sulfate, titanium (III) chloride, hydroxylamines and salts thereof, phosphates, glucose, and mixtures thereof.

Embodiment 3

The method of embodiment 1 or 2, wherein the oxidatively polymerizing 2,6-dimethylphenol comprises a first stage in which the reaction mixture is cooled to maintain a temperature of 10 to 35° C.

Embodiment 4

The method of embodiment 3, wherein the oxidatively polymerizing 2,6-dimethylphenol comprises a second stage in which the reaction mixture is heated to maintain a temperature of 20 to 50° C.

Embodiment 5

The method of any of embodiments 1-4, wherein the total weight of 2,6-dimethylphenol is 5 to 10 weight percent based on the total weight of 2,6-dimethylphenol and toluene solvent.

Embodiment 6

The method of any of embodiments 1-5, wherein the combining a chelant with the post-termination reaction mixture to form a chelation mixture comprises combining the post-termination reaction mixture with an aqueous solution of the chelant, adjusting the temperature of the resulting mixture to 40 to 55° C., and combining the resulting temperature-adjusted mixture with water to form the chelation mixture.

Embodiment 7

The method of any of embodiments 1-6, excluding a solvent removal step between the terminating the oxidative polymerization and the isolating the poly(2,6-dimethyl-1,4-phenylene ether).

Embodiment 8

The method of any of embodiments 1-7, wherein the isolating the poly(2,6-dimethyl-1,4-phenylene ether) from the separated organic phase comprises mixing in a first stirred tank the separated organic phase and a first portion of antisolvent to produce a first poly(2,6-dimethyl-1,4-phenylene ether) slurry; and mixing in a second stirred tank the first poly(2,6-dimethyl-1,4-phenylene ether) slurry and a second portion of antisolvent to produce a second poly(2,6-dimethyl-1,4-phenylene ether) slurry.

Embodiment 9

The method of embodiment 8, wherein the separated organic phase comprises 6 to 10 weight percent poly(2,6-dimethyl-1,4-phenylene ether).

Embodiment 10

The method of embodiment 8 or 9, wherein the first portion of antisolvent and the second portion of antisolvent each independently comprise 75 to 85 weight percent methanol and 15 to 25 weight percent toluene.

Embodiment 11

The method of any of embodiments 8-10, wherein the weight ratio of the separated organic phase to the first portion of antisolvent is 1.5:1 to 2:1; and wherein the weight ratio of the first poly(2,6-dimethyl-1,4-phenylene ether) slurry to the second portion of antisolvent is 0.9:1 to 1.2:1.

Embodiment 12

The method of any of embodiments 8-11, wherein the mixing in a first stirred tank and the mixing in a second stirred tank are each independently conducted at a temperature of 45 to 55° C.

Embodiment 13

The method of any of embodiments 8-12, wherein the mixing in a first stirred tank and the mixing in a second stirred tank are characterized by a total mixing energy of less than or equal to 4 kilojoules per kilogram.

Embodiment 14

The method of any of embodiments 1-13, wherein the isolated poly(2,6-dimethyl-1,4-phenylene ether) has a weight average molecular weight of at least 150,000 atomic mass units.

Embodiment 15

The method of any of embodiments 1-14, wherein the isolated poly(2,6-dimethyl-1,4-phenylene ether) has a weight average molecular weight of 150,000 to 230,000 atomic mass units.

Embodiment 16

The method of any of embodiments 1-15, wherein a difference in intrinsic viscosity less than or equal to 25 percent is observed between the dissolved poly(2,6-dimethyl-1,4-phenylene ether) and the isolated poly(2,6-dimethyl-1,4-phenylene ether).

Embodiment 17

The method of any of embodiments 1-16, wherein a difference in intrinsic viscosity of 10 to 25 percent is observed between the dissolved poly(2,6-dimethyl-1,4-phenylene ether) and the isolated poly(2,6-dimethyl-1,4-phenylene ether).

Embodiment 18

The method of any of embodiments 1-17, wherein a difference in intrinsic viscosity less than or equal to 0.30 deciliters per gram is observed between the dissolved poly(2,6-dimethyl-1,4-phenylene ether) and the isolated poly(2,6-dimethyl-1,4-phenylene ether).

Embodiment 19

The method of any of embodiments 1-18, wherein a difference in weight percent of molecules having a molecular weight less than 30,000 atomic mass units of less than or equal to 25 weight percent is observed between the dissolved poly(2,6-dimethyl-1,4-phenylene ether) and the isolated poly(2,6-dimethyl-1,4-phenylene ether).

Embodiment 20

The method of any of embodiments 1-19, wherein a difference in weight percent of molecules having a molecular weight less than 30,000 atomic mass units of 10 to 25 weight percent is observed between the dissolved poly(2,6-dimethyl-1,4-phenylene ether) and the isolated poly(2,6-dimethyl-1,4-phenylene ether).

Embodiment 21

The method of any of embodiments 1-20, wherein the isolated poly(2,6-dimethyl-1,4-phenylene ether) has a copper concentration less than or equal to 5 parts per million by weight.

Embodiment 22

The method of any of embodiments 1-21, wherein the isolated poly(2,6-dimethyl-1,4-phenylene ether) has a copper concentration of 0.5 to 5 parts per million by weight.

Embodiment 23

The method of any of embodiments 1-22, wherein the catalyst further comprises dimethyl-n-butylamine, di-n-butylamine, or a mixture thereof.

Embodiment 24

The method of any of embodiments 1-23, wherein the catalyst further comprises dimethyl-n-butylamine and di-n-butylamine.

Embodiment 25

The method of embodiment 1, wherein the catalyst further comprises dimethyl-n-butylamine and di-n-butylamine; wherein the oxidative polymerizing comprises initiating oxidative polymerization in the presence of 1 to 3 weight percent of the 2,6-dimethylphenol; wherein at least 97 weight percent of the 2,6-dimethylphenol is added to the reaction mixture after the initiation of oxidative polymerization and over the course of 55 to 65 minutes; wherein the oxidatively polymerizing comprises adding molecular oxygen and 2,6-dimethylphenol to the reaction mixture in a mole ratio of 0.3:1 to 0.5:1; wherein the oxidatively polymerizing 2,6-dimethylphenol comprises a first stage in which the reaction mixture is cooled to maintain a temperature of 20 to 30° C., and a second stage in which the reaction mixture is heated to maintain a temperature of 30 to 40° C.; wherein the method excludes a solvent removal step between the terminating the oxidative polymerization and the isolating the poly(2,6-dimethyl-1,4-phenylene ether); wherein the chelation mixture is maintained at a temperature of 45 to 55° C. for 40 to 70 minutes; wherein the separating the aqueous phase and the organic phase is conducted at a temperature of 45 to 55° C.; wherein time elapsed between termination of the oxidative polymerization and isolating the poly(2,6-dimethyl-1,4-phenylene ether) is 30 to 60 minutes; wherein the isolated poly(2,6-dimethyl-1,4-phenylene ether) has a number average molecular weight of 20,000 to 35,000 atomic mass units and 16 to 20 weight percent of molecules having a molecular weight less than 30,000 atomic mass units; and wherein the isolated poly(2,6-dimethyl-1,4-phenylene ether) has a copper concentration of 0.5 to 5 parts per million by weight.

Embodiment 26

A poly(2,6-dimethyl-1,4-phenylene ether) made by the method of any of embodiments 1-25.

Embodiment 27

A fiber comprising the poly(2,6-dimethyl-1,4-phenylene ether) solid of embodiment 26.

Embodiment 28

An article comprising the poly(2,6-dimethyl-1,4-phenylene ether) solid of embodiment 26.

Embodiment 29

A poly(2,6-dimethyl-1,4-phenylene ether) solid having a number average molecular weight of at least 18,000 atomic mass units, and less than 30 weight percent of molecules having a molecular weight less than 30,000 atomic mass units.

Embodiment 30

The poly(2,6-dimethyl-1,4-phenylene ether) solid of embodiment 29, having a copper concentration less than or equal to 5 parts per million by weight.

Embodiment 31

The poly(2,6-dimethyl-1,4-phenylene ether) solid of embodiment 29 or 30, having a number average molecular weight of 20,000 to 35,000 atomic mass units, 16 to 20 weight percent of molecules having a molecular weight less than 30,000 atomic mass units, and a copper concentration of 0.5 to 5 parts per million by weight.

Embodiment 32

A fiber comprising the poly(2,6-dimethyl-1,4-phenylene ether) solid of any of embodiments 29-31.

Embodiment 33

An article comprising the poly(2,6-dimethyl-1,4-phenylene ether) solid of any of embodiments 29-31.

Embodiment 34

The article of embodiment 33, wherein the article is an asymmetric hollow fiber membrane.

Embodiment 35

A fluid separation apparatus comprising the asymmetric hollow fiber membrane of embodiment 34.

The invention is further illustrated by the following non-limiting examples.

Examples 1-2

Comparative Examples 1-3

These examples illustrate variations in poly(2,6-dimethyl-1,4-phenylene ether) process variables including the percentage of total 2,6-dimethylphenol present in the reaction mixture when the polymerization is initiated, the time over which the remainder of the 2,6-dimethylphenol is added to the reaction mixture, the molar ratio of 2,6-dimethylphenol to catalyst metal in the reaction mixture, the molar ratio of oxygen to 2,6-dimethylphenol fed to the reaction mixture, the reaction mixture temperatures during the build and pump-out stages, the total reaction time, the time between termination of the polymerization reaction and the start of precipitation, and the time between termination of the polymerization reaction and the completion of precipitation.

The general reaction procedure was as follows. A percentage of the total 2,6-dimethylphenol (which has a purity of 99.86%), as specified in Table 1, is dissolved in toluene in a reaction vessel. To the resulting 2,6-dimethylphenol solution is added cuprous oxide in 48 weight percent HBr aqueous solution (a solution that is 6.5 weight percent copper), N,N'-dibutylethylenediamine (DBEDA; added as an approximately 25-28 weight percent solution in toluene), dimethylbutylamine (DMBA), di-n-butylamine (DBA), and didecyl dimethyl ammonium chloride. The molar ratio of total 2,6-dimethyl phenol to copper is specified in Table 1, as is the molar ratio of DBEDA to copper. The reaction is conducted as a semi-batch process with the continuous addition of 2,6-dimethylphenol over a period of time, and oxygen is added at a fixed rate (specified in Table 1) relative to the rate of 2,6-dimethylphenol addition. (This fixed rate of oxygen addition is maintained until the reaction nears completion, as evidenced by a step increase in headspace oxygen concentration; at that point, the rate of oxygen addition is decreased to maintain a headspace oxygen concentration no greater than 17 volume percent.) The time of "initiating oxidative polymerization" is the time at which oxygen is first introduced to the reaction mixture. All reaction mixtures had total solids of 7.1 weight percent, where total solids is the weight percent of total 2,6-dimethylphenol relative to the sum of total 2,6-dimethylphenol and toluene solvent. The initial phase of the reaction is exothermic, and cooling is used to maintain a reaction mixture temperature of about 30° C. When the exothermic phase of the reaction is completed, the so-called "build" phase of the reaction begins, and heating is used to raise the reaction mixture temperature to the value specified in Table 1. The end point of the reaction is reached at a fixed reaction time, e.g., 130 minutes, when the in-line viscosity reading indicates no further molecular weight build is occurring. At this point, flow of oxygen to the reactor is ceased (which terminates the polymerization reaction), oxygen in the headspace is removed (flushed out), an aqueous solution of the chelant trisodium nitrilotriacetate ($Na_3NTA$) is added to the reactor, and the temperature of the resulting mixture is adjusted to the so-called "pump-out" temperature. At this time, a small sample of the reaction mixture is removed. The small sample of the reaction mixture is diluted and analyzed by gel permeation chromatography to determine its intrinsic viscosity ("end of reaction IV"). The end of reaction intrinsic viscosity is determined using gel permeation chromatography as described below, using as calibration standards different poly(2,6-dimethyl-1,4-phenylene ether) samples having known intrinsic viscosities previously measured by Ubbelohde in chloroform at 25° C.

The reaction mixture is then pumped out of the reaction vessel into a vessel containing additional water. The resulting mixture is mixed for a specified time, then separated via liquid-liquid centrifugation to yield a poly(2,6-dimethyl-1,4-phenylene ether) solution and an aqueous phase. The poly(2,6-dimethyl-1,4-phenylene ether) solution thus obtained is combined with antisolvent to precipitate the poly(2,6-dimethyl-1,4-phenylene ether) as a powder. Typical precipitation conditions include using a poly(2,6-dimethyl-1,4-phenylene ether) solution with a poly(2,6-dimethyl-1,4-phenylene ether) concentration of 5-10 weight percent, a weight ratio of antisolvent to poly(2,6-dimethyl-1,4-phenylene ether) solution of 0.5:1 to 0.6:1 in a first precipitation tank and 1.7:1 to 2:1 in a second precipitation tank. The precipitated poly(2,6-dimethyl-1,4-phenylene ether) powder is isolated via filtration followed by two cycles of slurrying the powder with antisolvent and separating the powder with solid/liquid centrifugation. The start of precipitation is the time when a first portion of the poly(2,6-dimethyl-1,4-phenylene ether) solution is combined with a first portion of the antisolvent. The end of precipitation is the time when the last portion of the poly(2,6-dimethyl-1,4-phenylene ether) solution is combined with the last portion of antisolvent. The time elapsed between the end of reaction and start of precipitation is noted, as is the time elapsed between the end of reaction and the end of precipitation. The isolated poly(2,6-dimethyl-1,4-phenylene ether) powder is dried for 60-90 minutes at 180° C. and atmospheric pressure, using steam and nitrogen to flush away the toluene vapors. The intrinsic viscosity of the isolated powder ("powder IV") was measured by dissolving a sample of the isolated powder in toluene and analyzing by gel permeation chromatography as described for the dissolved ("end of reaction") sample.

Number average molecular weight and weight average molecular weight were determined by gel permeation chromatography as follows. The gel permeation chromatograph is calibrated using eight polystyrene standards, each of narrow molecular weight, and collectively spanning a molecular weight range of 3,000 to 1,000,000 grams/mole. The columns used were 1e3 and 1e5 angstrom Plgel columns with a 5 microliter 100 angstrom PLgel guard column. Chromatography was conducted at 25° C. The elution liquid was chloroform with 100 parts per million by weight di-n-butylamine The elution flow was 1.2 milliliters per minute. The detector wavelengths were 254 nanometers (for polystyrene standards) and 280 nanometers (for poly(2,6-dimethyl-1,4-phenylene ether)). A third degree polynomial function is fitted through the calibration points. Poly(2,6-dimethyl-1,4-phenylene ether) samples are prepared by dissolving 0.27 grams poly(2,6-dimethyl-1,4-phenylene ether) solid in 45 milliliters toluene. A 50 microliter sample of the resulting solution is injected into the chromatograph. The values of number average molecular weight ($M_n$) and weight average molecular weight ($M_w$) are calculated from the measured signal using the polystyrene calibration line. The values are subsequently converted from polystyrene molecular weight to true poly(2,6-dimethyl-1,4-phenylene ether) molecular weights using the formula: $M(PPO)=0.3122\times M(PS)^{1.073}$.

Process variations are summarized in Table 1. In Table 1, "Initial 2,6-dimethylphenol (wt %)" is the weight percent of total 2,6-dimethylphenol initially present in the reaction mixture; "Addition time (min)" is the time in minutes over which the remainder of 2,6-dimethylphenol is added; "2,6-dimethylphenol:Cu mole ratio" is the molar ratio of total 2,6-dimethylphenol to copper; "DBEDA:Cu mole ratio" is the molar ratio of N,N'-di-tert-butylethylenediamine to copper; "Oxygen:2,6-dimethylphenol feed mole ratio" is the molar ratio of molecular oxygen to 2,6-dimethylphenol fed to the reaction mixture during the addition of the remainder of 2,6-dimethylphenol; "Build temperature (° C.)" is the temperature in degrees centigrade at which the reaction mixture is maintained during the build phase of the reaction; "Total reaction time (min)" is the elapsed time in minutes between the beginning of the polymerization reaction (introduction of oxygen to the reaction vessel) and the end of the polymerization reaction (termination of oxygen addition to the reaction vessel); "Pump-out temperature (° C.)" is the temperature in degrees centigrade to which the combined reaction mixture and chelant solution are raised before being pumped out of the reactor into a vessel with additional water; "Total chelation time (min)" is the elapsed time between initiating addition of the chelant solution to the post-termination reaction mixture and completing separation of the combined reaction mixture, chelant solution, and additional water into a poly(2,6-dimethyl-1,4-phenylene ether) solution and an aqueous phase; "Time to start precipitation (min)" is the elapsed time in minutes between the end of the polymerization reaction and the time when a first portion of the poly(2,6-dimethyl-1,4-phenylene ether) solution is combined with a first portion of the antisolvent; "Time to end of precipitation (min)" is the elapsed time in minutes between the end of precipitation and the time when the last portion of the poly(2,6-dimethyl-1,4-phenylene ether) solution is combined with the last portion of antisolvent; "End of reaction IV (dL/g)" is the intrinsic viscosity, expressed in deciliters per gram, of the poly(2,6-dimethyl-1,4-phenylene ether) at the end of the polymerization reaction; "Powder IV (dL/g)" is the intrinsic viscosity, expressed in deciliters per gram, of the finally isolated poly(2,6-dimethyl-1,4-phenylene ether) powder (i.e., the product of the complete process); "IV drop (%)" is the percentage change in intrinsic viscosity between the end of the polymerization reaction and the final isolation; "End of reaction $M_n$ (AMU)" is the number average molecular weight, expressed in atomic mass units (AMU), of the poly(2,6-dimethyl-1,4-phenylene ether) at the end of the polymerization reaction; "Isolated powder $M_n$ (AMU)" is the number average molecular weight, expressed in atomic mass units, of the finally isolated poly(2,6-dimethyl-1,4-phenylene ether) powder; "End of reaction $M_w/M_n$" is the polydispersity index (weight average molecular weight divided by number average molecular weight) of the poly(2,6-dimethyl-1,4-phenylene ether) at the end of the polymerization reaction; "Isolated powder $M_w/M_n$" is the polydispersity index (weight average molecular weight divided by number average molecular weight) of the isolated poly(2,6-dimethyl-1,4-phenylene ether) powder; "End of reaction wt %<30,000(%)" is the weight percent of the end-of-reaction poly(2,6-dimethyl-1,4-phenylene ether) having a molecular weight less than 30,000 atomic mass units; "Isolated powder wt %<30,000(%)" is the weight percent of the finally isolated poly(2,6-dimethyl-1,4-phenylene ether) having a molecular weight less than 30,000 atomic mass units.

The results in Table 1 show that Examples 1 and 2 exhibited much smaller reductions in intrinsic viscosity and much smaller increases in weight fraction less than 30,000 atomic mass units between end of reaction and isolation than did Comparative Examples 1-3. Examples 1 and 2 had lower pump-out temperatures and shorter elapsed times between end of reaction and precipitation than did the Comparative Examples.

TABLE 1

|  | C. Ex. 1 | C. Ex. 2 | C. Ex. 3 | Ex. 1 | Ex. 2 |
|---|---|---|---|---|---|
| Initial 2,6-dimethylphenol (wt %) | 10 | 10 | 10 | 2.5 | 2.5 |
| Addition time (min) | 45 | 45 | 45 | 58 | 58 |
| 2,6-dimethylphenol:Cu mole ratio | 114:1 | 108:1 | 108:1 | 101:1 | 101:1 |
| DBEDA:Cu mole ratio | 1.83 | 1.74 | 1.74 | 1.74 | 1.78 |
| Oxygen:2,6-dimethylphenol feed mole ratio | 0.39:1 | 0.39:1 | 0.39:1 | 0.57:1 | 0.57:1 |
| Build temperature (° C.) | 46 | 46 | 46 | 46 | 40 |
| Total reaction time (min) | 130 | 130 | 130 | 145 | 207 |
| Pump-out temperature (° C.) | 60 | 60 | 60 | 50 | 50 |
| Total chelation time (min) | 80 | 80 | 80 | <30 | <30 |
| Time to start of precipitation | 650 | 420 | 360 | 200 | 60 |

TABLE 1-continued

|  | C. Ex. 1 | C. Ex. 2 | C. Ex. 3 | Ex. 1 | Ex. 2 |
|---|---|---|---|---|---|
| (min) |  |  |  |  |  |
| Time to end of precipitation (min) | 800 | 580 | 540 | 410 | 240 |
| End of reaction IV (dL/g) | 1.68 | 2.05 | 2.05 | 1.91 | 1.84 |
| Isolated powder IV (dL/g) | 1.05 | 1.42 | 1.37 | 1.55 | 1.64 |
| IV drop (%) | 38 | 31 | 33 | 21 | 11 |
| End of reaction $M_n$ (AMU) | 88,000 | — | — | 93,000 | 75,000 |
| Isolated powder $M_n$ (AMU) | 14,000 | — | — | 19,000 | 33,000 |
| Isolated powder $M_w$ (AMU) | 133,000 | — | — | 209,000 | 228,000 |
| End of reaction $M_w/M_n$ | 2.5 | — | — | 2.9 | 3.4 |
| Isolated powder $M_w/M_n$ | 9.5 | — | — | 11.0 | 6.9 |
| End of reaction wt % < 30,000 (%) | 5.2 | — | — | 5.0 | 5.9 |
| Isolated powder wt % < 30,000 (%) | 42.1 | — | — | 26.4 | 16.2 |

Comparative Examples 4-18

These experiments were conducted on a laboratory scale and are intended to isolate the effects of individual process variables. All reaction mixtures included 270 grams of 2,6-dimethylphenol and 3,200 grams of toluene. The addition time for 2,6-dimethylphenol was always 45 minutes. During the build phase of the reaction, oxygen concentration was maintained at 10 volume percent. After 130 minutes of reaction (at the end of the build phase), oxygen flow to the reactor was stopped. Then, the temperature of the reaction mixture was increased to 60° C. and a trisodium nitrilotriacetate solution was added to chelate the copper catalyst. After 90 minutes of stirring at 60° C., the mixture was centrifuged for 50 minutes at 70° C. to separate the aqueous and organic phases. The poly(2,6-dimethyl-1,4-phenylene ether) was precipitated by combining the organic phase with methanol antisolvent, and the resulting poly(2,6-dimethyl-1,4-phenylene ether) powder was filtered and dried overnight at 135° C.

In Table 2, "Catalyst (g)" refers to the weight, in grams, of the cuprous oxide solution described above; "DBEDA (g)" refers to the weight, in grams, of N,N'-dibutylethylenediamine; "DBA (g)" refers to the weight, in grams, of di-n-butylamine; "DMBA (g)" refers to the weight, in grams of dimethyl-n-butylamine; "Oxygen flow (SLM)" refers to the oxygen flow rate, in standard liters per minute, into the reaction vessel during the exotherm phase of the reaction; "Exotherm temperature (° C.)" is the temperature at which the reaction mixture is maintained (via cooling) during the exotherm phase of the reaction; "Isolated powder $M_w/M_n$" is the polydispersity index (weight average molecular weight divided by number average molecular weight) of the isolated poly(2,6-dimethyl-1,4-phenylene ether) powder.

Analysis of the results for the group of examples summarized in the first part of Table 2 reveals that higher end-of-reaction intrinsic viscosities are associated with lower oxygen flow rates and lower temperatures during the exotherm phase. Analysis of the group of examples summarized in the second part (the first continuation) of Table 2 reveals that higher end-of-reaction intrinsic viscosities are associated with higher catalyst concentrations. Analysis of the group of examples summarized in the third part (the second continuation) of Table 2 revealed no statistically significant correlation between end-of-reaction intrinsic viscosities and di-n-butylamine concentration.

TABLE 2

|  | C. Ex. 4 | C. Ex. 5 | C. Ex. 6 | C. Ex. 7 | C. Ex. 8 |
|---|---|---|---|---|---|
| Catalyst (g) | 27.3 | 34.1 | 27.3 | 27.3 | 27.3 |
| DBEDA (g) | 8.4 | 10.5 | 8.4 | 8.4 | 8.4 |
| DBA (g) | 11 | 11 | 11 | 11 | 11 |
| DMBA (g) | 87 | 87 | 115 | 87 | 87 |
| Initial 2,6-dimethylphenol (wt %) | 10 | 10 | 10 | 10 | 0 |
| Oxygen flow (SLM) | 0.66 | 0.66 | 0.66 | 0.66 | 0.40 |
| Exotherm temperature (° C.) | 25 | 25 | 25 | 10 | 25 |
| End of reaction IV (dL/g) | 1.58 | 1.65 | 1.67 | 2.05 | 1.92 |
| Isolated powder IV (dL/g) | 1.60 | 1.68 | 1.69 | 1.92 | 1.87 |
| Isolated powder $M_w/M_n$ | 3.3 | 3.9 | 4.0 | 4.4 | 4.3 |

|  | C. Ex. 9 | C. Ex. 10 | C. Ex. 11 | C. Ex. 12 | C. Ex. 13 |
|---|---|---|---|---|---|
| Catalyst (g) | 27.3 | 27.3 | 21.9 | 14.6 | 21.9 |
| DBEDA (g) | 8.4 | 8.4 | 6.7 | 4.5 | 6.7 |
| DBA (g) | 11 | 11 | 11 | 11 | 11 |
| DMBA (g) | 87 | 87 | 87 | 87 | 87 |
| Initial 2,6-dimethylphenol (wt %) | 10 | 10 | 10 | 10 | 10 |
| Oxygen flow (SLM) | 0.40 | 0.66 | 0.53 | 0.40 | 0.40 |
| Exotherm temperature (° C.) | 25 | 25 | 15 | 15 | 15 |
| End of reaction IV (dL/g) | 1.98 | 1.34 | 2.15 | 1.78 | 2.18 |
| Isolated powder IV (dL/g) | 1.61 | 1.36 | 1.93 | 1.25 | 1.70 |
| Isolated powder $M_w/M_n$ | 7.1 | 3.7 | 5.0 | 6.1 | 6.4 |

|  | C. Ex. 14 | C. Ex. 15 | C. Ex. 16 | C. Ex. 17 | C. Ex. 18 |
|---|---|---|---|---|---|
| Catalyst (g) | 14.6 | 42.3 | 29.6 | 29.6 | 29.6 |
| DBEDA (g) | 4.5 | 13.0 | 9.1 | 9.1 | 9.2 |
| DBA (g) | 11 | 0 | 0 | 2.8 | 5.5 |
| DMBA (g) | 87 | 87 | 87 | 87 | 87 |
| Initial 2,6-dimethylphenol (wt %) | 10 | 10 | 10 | 10 | 10 |

TABLE 2-continued

| | | | | | |
|---|---|---|---|---|---|
| Oxygen flow (SLM) | 0.53 | 0.40 | 0.40 | 0.40 | 0.40 |
| Exotherm temperature (° C.) | 15 | 25 | 25 | 25 | 25 |
| End of reaction IV (dL/g) | 1.72 | 2.48 | 2.03 | 1.82 | 2.11 |
| Isolated powder IV (dL/g) | 1.31 | 2.73 | 2.12 | 1.78 | 2.00 |
| Isolated powder $M_w/M_n$ | 5.3 | 5.8 | 4.5 | 5.6 | 5.5 |

Comparative Examples 19-32

These examples illustrate the effects of chelation temperature and time on the intrinsic viscosity of a poly(2,6-dimethyl-1,4-phenylene ether). The poly(2,6-dimethyl-1,4-phenylene ether) was produced in a lab-scale reactor using 17.3 grams catalyst, 5.33 grams di-t-butylethylenediamine, 9.86 gram di-n-butylamine, 32.1 gram dimethyl-n-butylamine, 5 weight percent of total 2,6-dimethylphenol initially present, an oxygen flow of 0.30 standard liters per minute, and a 30° C. exotherm temperature. After stopping the oxygen feed, the resulting solution was divided into two jacketed vessels and trisodium nitrilotriacetate and water were added. One vessel was kept at 50° C. and the other at 60° C. At the noted times, a sample was taken from the vessels and (after dilution with toluene) injected into a gel permeation chromatograph to determine the intrinsic viscosity of the poly(2,6-dimethyl-1,4-phenylene ether). The results, presented in Table 3, show that the poly(2,6-dimethyl-1,4-phenylene ether) intrinsic viscosity drops at a rate of about 5% per hour when the chelation temperature is 50° C., and a rate of about 11% per hour when the chelation temperature is 60° C.

TABLE 3

| | Chelation temperature (° C.) | Chelation time (hours) | Intrinsic viscosity (dL/g) | Intrinsic viscosity change (%) | $M_w/M_n$ |
|---|---|---|---|---|---|
| C. Ex. 19 | 50 | 0 | 1.755 | 0 | 2.80 |
| C. Ex. 20 | 50 | 1 | 1.721 | 2 | 2.65 |
| C. Ex. 21 | 50 | 2 | 1.656 | 6 | 3.29 |
| C. Ex. 22 | 50 | 3 | 1.555 | 11 | 3.54 |
| C. Ex. 23 | 50 | 4 | 1.431 | 18 | 3.88 |
| C. Ex. 24 | 50 | 20 | 0.641 | 63 | 5.03 |
| C. Ex. 25 | 50 | 24 | 0.607 | 65 | 5.14 |
| C. Ex. 26 | 60 | 0 | 1.755 | 0 | 2.80 |
| C. Ex. 27 | 60 | 1 | 1.616 | 8 | 3.66 |
| C. Ex. 28 | 60 | 2 | 1.349 | 23 | 4.86 |
| C. Ex. 29 | 60 | 3 | 1.153 | 34 | 5.64 |
| C. Ex. 30 | 60 | 4 | 0.996 | 43 | 6.18 |
| C. Ex. 31 | 60 | 20 | 0.552 | 69 | 5.45 |
| C. Ex. 32 | 60 | 24 | 0.531 | 70 | 5.73 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A poly(2,6-dimethyl-1,4-phenylene ether) solid having
    a number average molecular weight of 20,000 to 40,000 atomic mass units,
    a weight average molecular weight of 150,000 to 400,000 atomic mass units, and
    10 to 30 weight percent of molecules having a molecular weight less than 30,000 atomic mass units.

2. The poly(2,6-dimethyl-1,4-phenylene ether) solid of claim 1, having a copper concentration less than or equal to 5 parts per million by weight.

3. The poly(2,6-dimethyl-1,4-phenylene ether) solid of claim 1, having
    a number average molecular weight of 20,000 to 35,000 atomic mass units,
    16 to 20 weight percent of molecules having a molecular weight less than 30,000 atomic mass units, and
    a copper concentration of 0.5 to 5 parts per million by weight.

4. A fiber comprising the poly(2,6-dimethyl-1,4-phenylene ether) solid of claim 1.

5. An article comprising the poly(2,6-dimethyl-1,4-phenylene ether) solid of claim 1.

6. The article of claim 5, wherein the article is an asymmetric hollow fiber membrane.

* * * * *